(12) United States Patent
Theiste et al.

(10) Patent No.: US 6,249,369 B1
(45) Date of Patent: Jun. 19, 2001

(54) COUPLED ELECTROCHROMIC COMPOUNDS WITH PHOTOSTABLE DICATION OXIDATION STATES

(75) Inventors: David A. Theiste, Byron Center; Kelvin L. Baumann, Holland; Punam Giri, Holland; Thomas F. Guarr, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/350,879

(22) Filed: Jul. 9, 1999

(51) Int. Cl.[7] ..................................... G02F 1/15
(52) U.S. Cl. ........................... 359/265; 359/273
(58) Field of Search ..................... 359/265, 273, 359/603, 604, 605, 272, 266, 267

(56) References Cited

U.S. PATENT DOCUMENTS

| | | | |
|---|---|---|---|
| 4,902,108 | 2/1990 | Byker | 350/357 |
| 5,724,187 | 3/1998 | Varaprasad et al. | 359/608 |

OTHER PUBLICATIONS

Martin R. Bryce, "Organic Metals: Synthesis and Properties of Bis–(1,3–benzodithiole–2–ylidene)ethane Bi–(benzo–1, 3–dithiafulven–6–yl)", J. Chem. Soc., Chem. Commun., 1983, pp. 4–5.

J. Guay and A. Diaz, "Electrooxidation of Soluble α,α–Coupled Thiophene Oligomers", Chem. Mater.1992, 4, 254–255.

William H. Morrison, Jr. et al., "Polarographic and Magnetic Susceptibility Study of Various Biferrocene Compounds", Inorganic Chemistry, vol. 12, No. 9, 1973, pp. 1998–2004.

D. Astruc et al., "Electronic Communication and Switching between two Iron Atoms across the Phenathrene–Dihydrophenanthrene Bridging Ligands", J. Chem. Soc., Chem.-Commun., 1995.

Teng–Yuan Dong et al., "The Fundamental Nature of Electron Transfer in Mixed–valence Biferrocenium Salts", J. Chem. Soc., Chem.–Commun., 1990, pp. 1332–1334.

Ulrigh T. Mueller–Westerhoff, "[m.m]Metallocenophanes: Synthesis, Structure, and Properties", Angew Chem.Int. Ed. Engl., 25 (1986), pp. 702–717.

Mircea V. Diudea, "New Reactions of Phenothiazine Green Cations and Their Metal Complexes", Tetrahedron Letters, vol. 23, No. 13, 1982, Printed in Great Britain, pp. 1367–1370.

Yuan Yu et al., "Spectra and Reactivity of Methoxyoligothiophene Cation Radicals", J. Am. Chem. Soc. 1996, 118, pp. 10313–1018.

Shawn A. Sapp et al., "Rapid Switching in Electrochromic Devices Based On Complementary Conducting Polymer Films", ACS New Orleans, Spring 1996.

*Primary Examiner*—Hung Xuan Dang
(74) *Attorney, Agent, or Firm*—Brian J. Rees; Factor & Partners, LLC

(57) ABSTRACT

Coupling of anodic electrochromic compounds by a covalent bond or a bridge link which provides for electronic communication between the coupled electrochromic compounds results in coupled electrochromic compounds which exhibit greater stability as well as electrochromic activity that differs from the monomeric electrochromic compounds. Extension of the absorption spectrum into the near-infrared region of the spectrum is frequently observed. The coupled electrochromic compounds are highly suitable for use in electrochromic media used to produce electrochromic devices.

20 Claims, 3 Drawing Sheets

COUPLED ELECTROCHROMIC COMPOUNDS WITH PHOTOSTABLE DICATION OXIDATION STATES

TECHNICAL FIELD

The present application relates to anodic electrochromic materials. More particularly, the present invention relates to coupled anodic electrochromic compounds wherein two or more monomeric electrochromic compounds are coupled to give a new anodic compound with improved properties over the monomeric electrochromic compounds.

BACKGROUND ART

Electrochromic devices, and electrochromic media suitable for use therein, are the subject of numerous U.S. patents, including U.S. Pat. No. 4,902,108, entitled "Single-Compartment, Self-Erasing, Solution-Phase Electrochromic Devices, Solutions for Use Therein, and Uses Thereof", issued Feb. 20, 1990 to H. J. Byker; Canadian Pat. No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device:, issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al., each of which patents is assigned to the assignee of the present invention and the disclosures of each of which are hereby incorporated herein by reference, are typical of modern day automatic rearview mirrors for motor vehicles. These patent references describe electrochromic devices, their manufacture, and electrochromic compounds useful therein, in great detail.

While numerous electrochromic devices are possible, the greatest interest and commercial importance are associated with electrochromic windows, electronic displays, light filters and mirrors. A brief discussion of these devices will help to facilitate an understanding of the present invention.

Electrochromic devices are, in general, prepared from two parallel substrates coated on their inner surfaces with conductive coatings, at least one of which is transparent such as tin oxide, or the like. The two substrates of the device are separated by a gap or "cavity", into which is introduced the electrochromic medium. A commercially available electrochromic medium typically contains a solvent and at least one anodic and/or cathodic electrochromic compound which changes color upon electrochemical oxidation or reduction. Upon application of a suitable voltage between the electrodes, the electrochromic compounds are oxidized or reduced depending upon their redox type, changing the color of the electrochromic medium. The electrochromic compounds change from a colorless or near colorless state to a colored state. Upon removal of the potential difference between the electrodes, the electrochemically activated redox states of electrochromic compounds react, becoming colorless again, and "clearing" the device.

In electrochromic mirrors, devices are constructed with a reflecting surface located on the outer surface of the substrate which is most remote from the incident light (i.e. the back surface of the mirror), or on the inner surface of the substrate most remote from the incident light. Thus, light striking the mirror passes through the front substrate and its inner transparent conductive layer, through the electrochromic medium contained in the cavity defined by the two substrates, and is reflected back from a reflective surface as described previously. Application of voltage across the inner conductive coatings results in a change of the light reflectance of the mirror.

In electrochromic devices, including windows and mirrors, the selection of the components of the electrochromic medium is critical. The medium must be capable of reversible color changes over a life cycle of many years, including cases where the device is subject to high temperatures as well as exposure to ultraviolet light.

A variety of anodic electrochromic compounds are available, among which are the 5,10,-dihydrophenazines, their phenothiazine analogs, and both ring-substituted as well as heteroatom-substituted derivatives. For example, 5,10-dimethyl-5,10-dihydrophenazine:

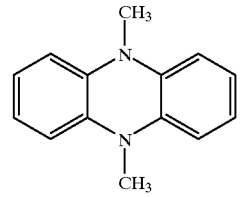

is a well known electrochromic compound. When this compound is oxidized to the 1+ oxidation state, the compound exhibits a weak absorption band at ~700 nm and a more intense, but still modest, absorbance at ~450 nm in the visible region of the visible spectrum.

The compound can be oxidized at higher potentials to the more highly oxidized 2+ species, which is more susceptible to both thermal and photo degradation. Moreover, some 2+ species can exist even in devices where the applied voltage is well controlled and less than that required for direct oxidation, (e.g. by disproportionation of 1+ species).

Heretofore, electrochromic devices have not found wide acceptance as architectural windows, where darkening during daylight hours (thus being subject to UV exposure in their activated state) is a frequent occurrence. Electrochromic devices used in these environments have shown a tendency to degrade over time, even when UV absorbing coatings and additives are used in attempts to mitigate these effects. Thus the need exists for electrochromic devices that have the stability desired for applications such as architectural windows and glazings for automobiles. Additionally it is desirable to obtain anodic electrochromic materials with more intense absorbances in the visible as well as absorbances in the near-infrared regions of the electromagnetic spectrum.

DISCLOSURE OF INVENTION

It has now been surprisingly discovered that properly bridging two or more anodic monomeric electrochromic compounds can afford coupled electrochromic compounds with electrochemically activated forms that have enhanced photochemical stability. Such coupled electrochromic compounds also have electrochemical properties and absorption properties different than their uncoupled analogs, and in many cases, are found to exhibit absorbance in the near-infrared region of the spectrum.

BEST MODE FOR CARRYING OUT THE INVENTION

Figure 1:
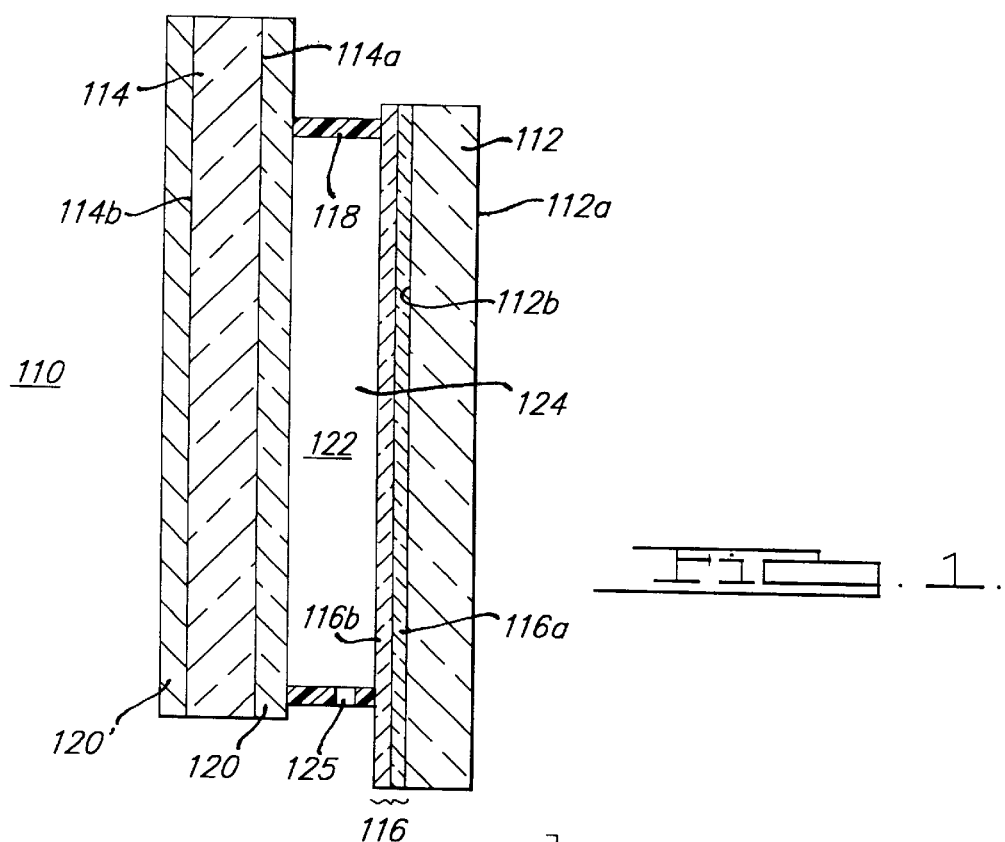
FIG. 1 is a cross sectional view of an electrochromic device.

FIG. 1 shows a cross-sectional view of an electrochromic device 110, which may be a mirror, a window, a display device, and the like. Device 110 has a front transparent element 112 having a front surface 112a and a rear surface 112b, and a rear element 114 having a front surface 114a and a rear surface 114b. Since some of the layers of the device are very thin, the scale has been distorted for pictorial clarity. Also, for clarity of description of such a structure, the following designations will be used hereinafter. The front surface 112a of the front element will be referred to as the first surface and the back surface 112b of the front element as the second surface. The front surface 114a of the rear element will be referred to as the third surface, and the back surface 114b of the rear element as the fourth surface.

Front transparent element 112 may be any material which is transparent and has sufficient strength to be able to operate in the conditions, e.g., varying temperatures and pressures, commonly found in the environment of the intended use. Front element 112 may comprise any type of borosilicate glass, soda lime glass, float glass or any other material, such as, for example, a polymer or plastic such as Topaz®, available from Ticoma, Summit N.J., that is generally transparent in the visible region of the electromagnetic spectrum. Front element 112 is preferably a sheet of glass with a thickness ranging from 0.5 millimeters (mm) to about 12.7 mm. Rear element 114 must meet the operational conditions outlined above, except that if the electrochromic device is a mirror, rear element 114 does not need to be transparent, and therefore may comprise polymers, metals, glass, ceramics, and preferably is a sheet of glass with a thickness ranging from 0.5 mm to about 12.7 mm. If the front and/or rear elements 112 and 114 comprise sheets of glass, the glass can be tempered prior to or subsequent to being coating with the layers of electrically conductive material (116 and 120).

One or more layers of a transparent electrically conductive material 116 are deposited on the second surface 112b to act as an electrode. Transparent conductive material 116 is desirably a material that: is substantially transparent to visible light; bonds well to front element 112 and maintains this bond when the sealing member 118 bonds thereto; is resistant to corrosion by any materials within the electrochromic device; is resistant to corrosion by the atmosphere; and has minimal diffuse or specular reflectance and good electrical conductance. Transparent conductive material 116 may be fluorine doped tin oxide (FTO), tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany, and the materials described in above-referenced U.S. Pat. No. 5,202,787, such as TEC 20 or TEC 15, available from Libbey Owens-Ford Co. (LOF) of Toledo, Ohio. Co-pending U.S. Patent Application entitled "An Improved Electro-Optic Device Including A Low Sheet Resistance, High Transmission Transparent Electrode" describes a two layer, low sheet resistance, high transmission, scratch resistant transparent electrode that forms strong bonds with adhesives, is not oxygen sensitive, and can be bent to form convex or aspheric electro-optic mirror elements or tempered in air without adverse side effects. The disclosure of this commonly assigned Application is hereby incorporated herein by reference. Similar requirements are needed for the layer 120 deposited onto the third surface 114a, whether it is a transparent conductive material used in electrochromic windows and in mirrors having a fourth surface reflector (120'), or a combined reflector/electrode used in electrochromic mirrors having a third surface reflector, in such case no fourth surface coating is necessary.

The coating 120 of the third surface 114a is sealably bonded to the coating 116 on the second surface 112b near the outer perimeter by a sealing member 118, thereby defining a chamber 122. The coating 120 on the third surface may vary depending on the final use of the device 110. If the device 110 is an electrochromic window, the coating 120 is preferably a transparent conductive coating similar to coating 116. If, however, device 110 is an electrochromic mirror, then coating 120 may be either a transparent conductive coating similar to coating 116 (in which case the reflector is placed on the fourth surface), or coating 120 may be a layer of a reflecting material in accordance with the teachings of U.S. Pat. No. 5,818,625, herein incorporated by reference. Typical coatings for the third surface reflector are chrome, rhodium, silver, silver alloys and combinations thereof.

Sealing member 118 may be any material which is capable of adhesively bonding the coatings on the second surface 112b to the coatings on the third surface 114a to seal the perimeter such that electrochromic medium 124 does not leak from chamber 122. Optionally, the layer of transparent conductive coating 116 and the layer 120 on the third surface 114a may be removed over a portion where sealing member 118 is disposed, but generally not the entire portion, otherwise the drive potential would be difficult to apply to the two coatings. When the conductive coatings are removed, sealing member 118 must bond well to glass.

The performance requirements for a perimeter seal member 118 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting, or UV curing organic sealing resins are preferred. Such organic resin sealing systems for LCD's are described in U.S. Pat. Nos. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermal curing, for example mixtures of liquid epoxy resin with liquid polyamide resin or dicyandiamide, or may be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability and spacers such as glass beads or rods can be used to control final seal thickness and substrate spacing. Suitable epoxy resins and spacers for use in a perimeter seal member 118 are disclosed in U.S. patent application Ser. No. 08/834,783, entitled "An Electrochromic Mirror With Two Thin Glass Elements And A Gelled Electrochromic Medium", which is hereby incorporated herein by reference.

The electrochromic medium 124 includes electrochromic anodic and cathodic materials that generally can be selected from the following categories:

(i) Single layer—the electrochromic medium is a single layer of material which may include small nonhomogeneous regions and includes solution phase devices where a material is contained in solution in the ionically conducting electrolyte and remains in solution in the electrolyte when electrochemically oxidized or reduced. Solution phase electroactive materials may be contained in the continuous solution phase of a cross linked polymer matrix in accordance with the teachings of U.S. Pat. Nos. 5,679,283 and 5,888,431, both entitled "ELECTROCHROMIC LAYER AND DEVICES COMPRISING SAME", and U.S. application Ser. No. 08/616,967, entitled "IMPROVED ELECTROCHROMIC LAYER AND DEVICES COMPRISING SAME" or International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

Prior art electrochromic media generally employed two electrochromic compounds, one anodic and one cathodic, and were unable to acceptably produce gray shades, and numerous other shades of color as well. In U.S. application Ser. No. 08/837,596, filed Apr. 2, 1997, and entitled "AN IMPROVED ELECTROCHROMIC MEDIUM CAPABLE OF PRODUCING AN PRESELECTED COLOR" herein incorporated by reference, non-staging devices capable of achieving a preselected color are disclosed. These devices contain at least three electroactive materials, at least two of which are electrochromic compounds, and exhibit little or no staging while being available in neutral colors such as gray, or in other preselected colors not normally available.

The anodic and cathodic materials can be combined or linked by a bridging unit as described in International Application Serial No. PCT/W097/EP498 entitled "ELECTROCHROMIC SYSTEM". It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application Serial No. PCT/WO98/EP3862 entitled "ELECTROCHROMIC POLYMER SYSTEM" or International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

Also included is a medium where one or more materials in the medium undergoes a change in phase during the operation of the device, for example a deposition system where a material contained in solution in the ionically conducting electrolyte which forms a layer, or partial layer on the electronically conducting electrode when electrochemically oxidized or reduced.

In these single layer devices the electrochromic medium 124 includes at least one anodic and one cathodic material, with at least one being electrochromic. Generally the materials are colorless or nearly colorless in their unactivated state, so that when the potential difference across the electrodes is zero the electrochromic medium is colorless or nearly colorless. When a sufficient potential difference is applied between the electrodes 116 and 120 the cathodic species are reduced at the cathode, i.e. accept electrons from the cathode. On the other hand anodic species are oxidized at the anode i.e., they donate electrons to the anode. As the anodic and cathodic species in the electrochromic medium 124 accept and donate electrons to and from the electrodes 116 and 120, at least one species becomes colored. The anodic and cathodic species in medium 124 return to their unactivated state when they exchange electrons towards the center of chamber 122. The activated species can reach this "recombination zone" through various routes including diffusion of the activated forms themselves, diffusion of charge, migration etc. This self-erasing process allows the cell to clear when the potential is removed. As long as the potential applied is large enough for the electrochemical oxidation and reduction to take place the electrochromic cell will be colored.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide and vanadium oxide. A medium which contains one or more organic electrochromic layers, such as polythiophene, polyaniline or polypyrrole attached to the electrode would also be considered a multilayer medium.

In addition the electrochromic medium may also contain other materials such as light absorbers, light stabilizers, thermal stabilizers, antioxidants, thickeners or viscosity modifiers or tint providing agents. Among ultraviolet stabilizer agents, known to stabilize plastics, are the compound ethyl-2-cyano-3,3-diphenyl acrylate, sold by BASF (Parsippany, N.J.) under the trademark Uvinul N-35 and by Aceto Corporation (Flushing, N.Y., USA) under the trademark Viosorb 910; the compound (2-ethylhexyl)-2-cyano-3,3-diphenyl acrylate, sold by BASF under the trademark Uvinul N-539; the compound 2-(2'-hydroxy-4'-methylphenyl)benzotriazole, sold by Ciba-Geigy Corp. under the trademark Tinuvin P®; the compound 2-hydroxy-4-methoxybenzophenone, sold by American Cyanamid under the trademark Cyasorb UV 9; and the compound 2-ethyl-2'-ethoxyoxalanilide, sold by Sandoz Color & Chemicals under the trademark Sanduvor VSU.

EC devices having as a component part an EC medium can be used in a wide variety of applications wherein the transmitted or reflected light is modulated. Such devices include rear-view mirrors such as are used for vehicles; windows for the exterior of a building, home or vehicle; skylights for buildings including tubular light filters; windows in office or room partitions; display devices; contrast enhancement filters for displays; light filters for photographic devices and light sensors; and indicators for power cells and batteries.

Any electroactive material may be used in accord with this invention, preferred however are electrochromic materials, especially organic electrochromic materials.

To further describe the invention we will briefly review some of the properties of 5,10-dimethyl-5,10-dihydrophenazine, a commonly used anodic electrochromic material with the structure

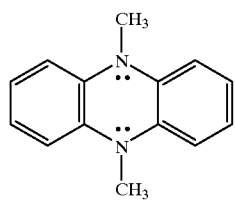

and having 16 π electrons in the neutral, colorless form. Electrochemical removal of one electron gives:

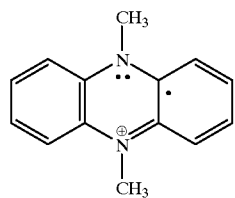

Further oxidation leads to:

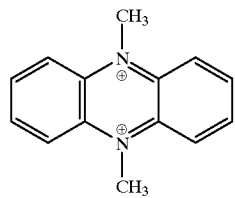

This 2e– oxidized form has 14 π electrons.

For an anodic material in general, the energy required to remove an electron will be related to several factors including the environment (solvation energy changes), orbital energy levels, and geometry changes. Electrochemical measurements such as cyclic voltammograms or differential pulse voltammograms give energies required to cause the redox process to occur.

Redox potentials are readily measured using a variety of standard electrochemical techniques. Often, cyclic voltammetry is used, and the redox potential is taken as the average of the anodic and cathodic peak potentials. However, the influence of electrode kinetics and of background current can make it extremely difficult to accurately measure potentials in this way, particularly when two redox processes occur at similar potentials (i.e.,<100 mV apart). In such cases, pulse methods such as differential pulse voltammetry are preferred. Differential pulse voltammetry employs an applied waveform that consists of small pulses superimposed on a potential staircase. The current is not monitored continuously; rather, it is sampled at a set time interval after each pulse. Because the background current decays more quickly than does the current attributed to the redox process, this delay essentially eliminates nonfaradaic (background) contributions. A typical differential pulse voltammogram shows negligible background current and distinct well-defined peaks from each redox process. The peak maxima correlate directly with redox potentials. Using differential pulse voltammetry, closely spaced redox processes can be resolved provided that they differ by at least about 20 mV.

These changes in the electron configuration lead to changes in the electronic absorption spectra of the material in the different oxidation states. Electronic transitions between the ground and excited state of a conjugated organic molecule can also give insights into the nature of the conjugated electronic structure of the molecule. Generally, long wavelength transitions indicate more extended conjugation in the molecule. Additionally, a formal transfer of charge from one atom or part of a molecule to another will lead to observed transitions.

In accordance with the present invention, compounds can be prepared with the general formula:

with A and B being the same or different monomeric electrochromic compound and X being the coupling unit that allows electronic communication (or interaction) between A and B. In its broadest sense electronic communication means that the presence of A, or a change in its electronic configuration (e.g., by oxidation or reduction) will affect the properties of B. In addition, three or more monomers can be coupled with an upper limit, usually up to about seven to ten monomers.

By coupling is meant bonding between monomeric electrochromic compounds which causes the coupled electrochromic compound to exhibit electrochemical and/or spectral properties which show electronic interaction between the two monomeric electrochromic compounds as opposed to behavior which is approximately the sum of the individual contributions of monomeric electrochromic compounds. In many cases, the coupling will be by means of a delocalized π-electron system which, at least for certain contributing structures, extends between the coupled electrochromic compounds. Thus, the coupling will usually be accomplished by a covalent bond, by an aromatic ring system, or by a conjugated unsaturated system.

Coupling between A and B can be seen by one or more of:
a) electrochemical behavior exhibiting more than one first electron redox potential, each being with respect to the first electron removed from each monomeric electrochromic compound, the redox potentials being different from the first redox potential of the uncoupled monomeric electrochromic compounds; or b) exhibiting a spectrum in any readily accessible oxidation state which is not merely the sum of the spectra of the monomeric electrochromic compound(s), but which exhibits substantially different absorption in terms of the absorbency (extinction coefficient), absorption spectrum (color), or both.

The monomeric electrochromic compounds useful in this invention can be substituted and unsubstituted fused ring systems such as 5,10-dihydrophenazine, 10-hydro-5,10-phenothiazine, 10-hydro-5,10-phenoxazine, benzidines, triphenodioxazines, triphenodithiazines, various metallocenes, quinoxalinophenazines, phenylenediamines, benzimidazole azines, benzoxazole azines, carbazoles, and benzothiazole azines.

All these systems may be substituted with a wide variety of substituents, including, without limitation, hydrocarbon groups such as $C_{1-20}$ alkyl, $C_{2-20}$ alkenyl, $C_{2-20}$ alkynyl, $C_{3-20}$ cycloalkyl, $C_{4-20}$ cycloalkenyl, $C_{6-20}$ aryl, $C_{7-20}$ aralkyl, and the like. Each of these hydrocarbon substituents may contain one or more heteroatoms in lieu of or in addition to the carbon atoms in the ring or chain, as the case may be, and each may be unsubstituted or substituted by functional and non-functional groups such as hydroxyl, alkoxy, cyano, halo, carboxy, keto, aldehydo, nitro, ester, polyoxyalkyl, and the like. The base rings may also be fused to other ring systems, such as $C_{4-20}$ cycloalkyl, $C_{4-20}$ cycloalkenyl, benzo, phenanthro, anthro, quinoxilino, etc. The unsaturated hydrocarbons may have one or more points or unsaturation, of the same or different type.

Further ring substituents include alkenylether, i.e. vinylether, alkoxy, cyano, amino, hydroxyl, ester, amide, imide, keto, aldehydo, carbamide, thioether, thiocarbamide, etc. Alkyl, alkenyl, cycloalkenyl, aryl groups, and like groups contained in these substituents, for example keto groups R—C(O), follow the carbon atom limitations given in the previous paragraph for these respective groups.

Most preferred monomeric electrochromic compounds include substituted and unsubstituted 5,10-dihydrophenazines, phenothiazines, and phenoxazines. The resulting coupled compounds have the following general structures:

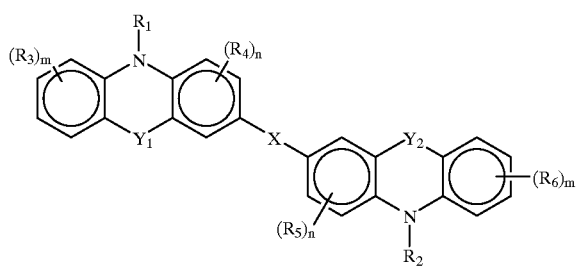

[I]

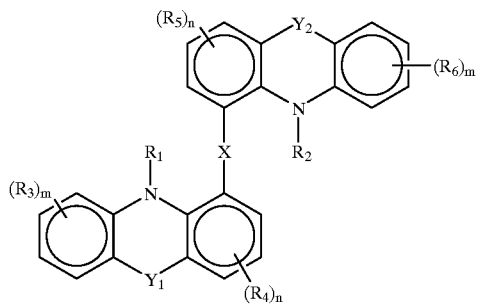

[II]

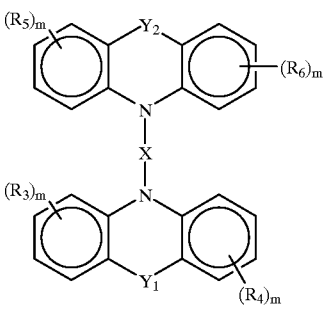

[III]

Where $Y_1$ and $Y_2$ are selected from O, S, and N—$R_7$; and

X represents a coupling group or unit such as $C_{1-3}$ alkyl, $C_{2-6}$ alkenyl, $C_{2-6}$ alkynyl, $C_{4-10}$ cycloalkenyl, $C_{6-20}$ aryl, $C_{7-20}$ alkaryl, $C_{7-20}$ aralkyl; optionally containing heteroatoms; and $R_1$ through $R_7$ are the same or different hydrocarbon groups such as $C_{1-20}$ alkyl, $C_{2-20}$ alkenyl, $C_{2-20}$ alkynyl, $C_{3-20}$ cycloalkyl, $C_{4-20}$ cycloalkenyl, $C_{6-20}$ alkaryl, $C_{7-20}$ aralkyl; and the like n is an integer from 1–3; and m is an integer from 1–4.

Each of these hydrocarbon substituents may contain one or more heteroatoms in lieu of or in addition to the carbon atoms in the ring or chain, as the case may be, and each may be unsubstituted or substituted by functional and non-functional groups such as hydroxyl, alkoxy, cyano, halo, carboxy, keto, aldehydo, nitro, ester, amide, polyoxyalkyl, and the like.

Coupling of monomeric electrochromic compounds may take place by standard methods, i.e. by the reductive coupling of monomeric electrochromic compounds bearing reactive halo groups by reaction with active metal, etc. Coupled electrochromic compounds may also be synthesized by forming the coupling group during synthesis of the coupled electrochromic compound rather than by later coupling monomeric electrochromic compounds. Thus, if the target coupled electrochromic compound molecule is a coupled 2,3,5,10-tetramethyl-5,10-dihydrophenazine, coupled by a covalent bond, one suitable synthesis would start as follows:

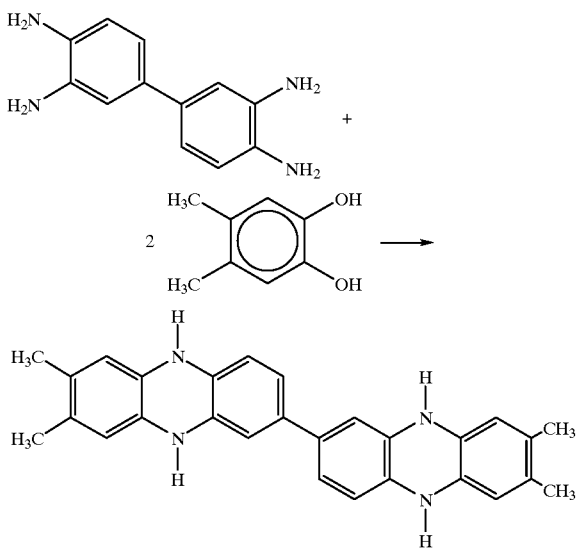

followed by N-methylation at each of the 5,5' and 10,10' positions. Such syntheses are disclosed in U.S. application Ser. No. 09/280,396, herein incorporated by reference.

The coupling may be through the ring carbons of the aromatic portions of the molecule, or where the monomeric electrochromic compound has a non-aromatic ring nitrogen or phosphorus, may be at this position, for example from the 5 and/or 10 position of a 5,10-dihydrophenazine, or the 10-position of a 10-phenoxazine.

The effects of the coupling are best shown by the electrochemical and spectral behavior. Monomeric electrochromic compounds such as 5,10-dimethyl-5,10-dihydrophenazine, shown in FIG. 2, generally exhibit two current peaks on oxidation which represent the loss of first and second electrons to produce 1+ and 2+ charged species, respectively. Similarly, a linked but non-coupled electrochromic compound will exhibit, based on the same total moles of monomeric electrochromic compound, a voltammogram which will be very similar to that of a similarly substituted monomeric electrochromic compound.

For example, the spectrum of the compound:

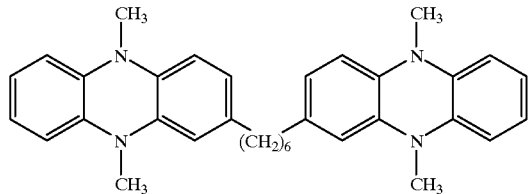

which is linked, but not coupled, should be substantially the same as that of

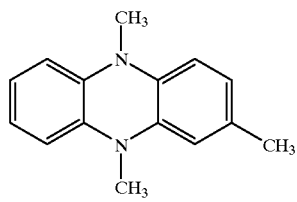

Thus, the absorption spectrum of linked but non-coupled electrochromic compounds should be substantially the same as the monomeric electrochromic compound, and the current/voltage behavior should be virtually the same as well, exhibiting a single peak (similar to FIG. 2) which represents both the removal of a single electron from one half of the linked but non-coupled electrochromic compound and removal of a first electron (two electrons total) from the other half of the linked but non-coupled electrochromic compound. In other words, both these electrons will be removed at substantially the same redox potential, i.e., independently of each other. The same is true for each of the second electrons for each half. The identity of these redox potentials between the linked but non-coupled electrochromic compound and the monomeric electrochromic compound is also indicative of a lack of coupling between the two halves of the linked but non-coupled electrochromic compound. In other words, the linkage between the monomeric electrochromic compounds is insufficient to cause any substantial difference in the energy levels of the molecular orbitals of the linked but non-coupled electrochromic compounds. The monomeric electrochromic compounds behave independently.

Figure 2:
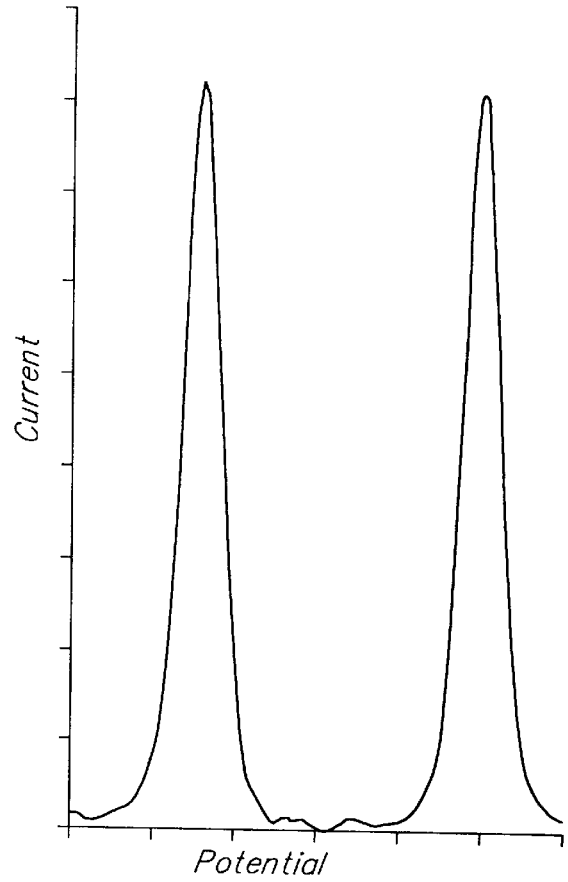
FIG. 2 is a plot of a voltammogram showing the electrochemical oxidation of 5,10-dimethyl-5,10-dihydrophenazine.
Figure 3:
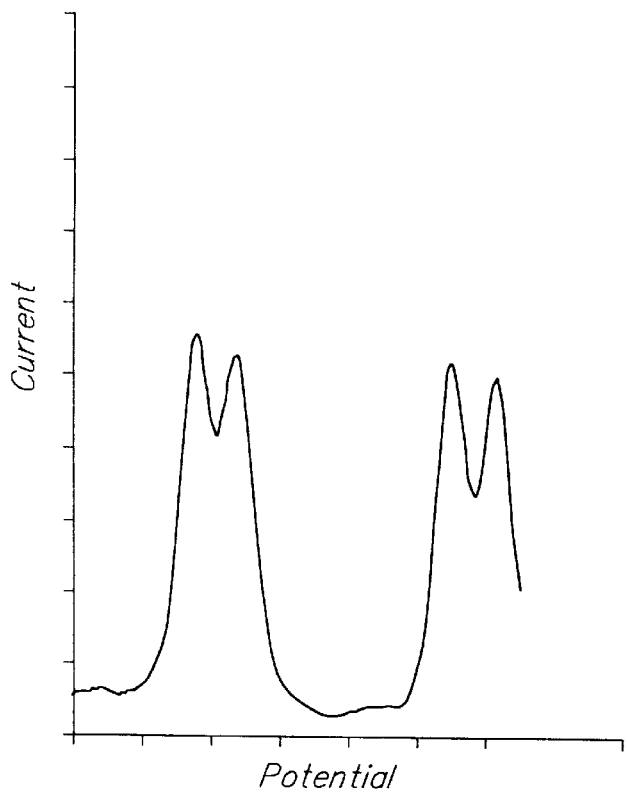
FIG. 3 is a plot of a voltammogram showing the electrochemical oxidation of 2,2'-bis(5,10-dimethyl-5,10-dihydrophenazine).

FIG. 3 illustrates the coupled electrochromic compound 2,2'-bis(5,10-dimethyl-5,10-dihydrophenazine). In FIG. 3, two of the monomeric electrochromic compounds whose electrochemical behavior is shown in FIG. 2 were coupled through a covalent bond. That these molecules are coupled and not monomeric or even merely linked is shown by the two current peaks entered at +236 mV and +348 mV, which correspond to removal of a first electron (from one half of the coupled electrochromic compound), and a second electron (from the other half). Note that the first electron is removed more easily (at a less positive redox potential) than the first electron (300 mV) of the monomeric electrochromic compound, and demonstrates the effect of the electronic communication. Further evidence of electronic communication is that removal of the second electron is more difficult in the coupled 2,2'-bis(5,10-dimethyl-5,10-dihydrophenazine), (348 mV), despite the fact that the electron is being removed from a different half of the coupled electrochromic compound. In other words, the removal of an electron from the first half affects the properties of the other half. The same behavior is exhibited by the second electron removal from each half ($3^{rd}$ and $4^{th}$ electrons).

The electronic communication can occur via an extended π electronic system, a σ system or via through space effects. Extended π electronic systems have proven to be very efficient in this coupling. Thus, the ability of the two halves of the compound to show electronic communication is related to the geometric structure of the oxidized form of the material. Materials with strong communication will give result in a planar, or nearly planar, geometry and weak electronic communication will be non-planar or twisted geometry.

Figure 4:
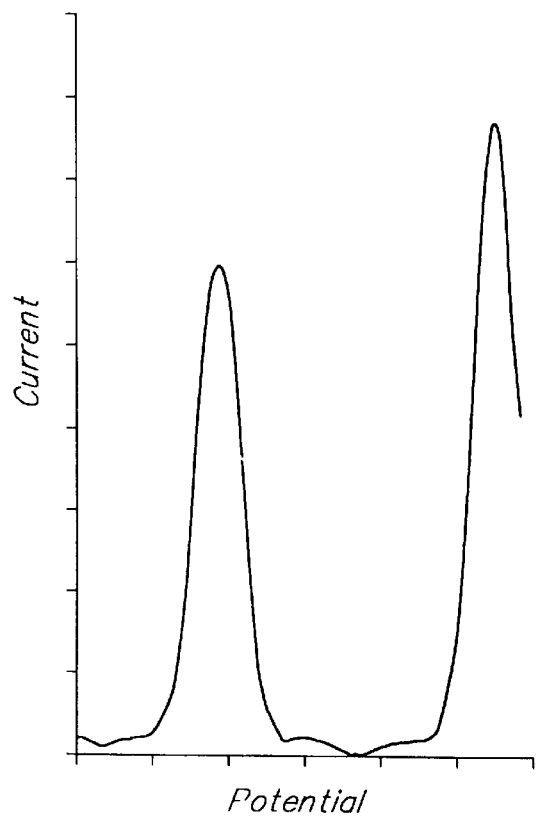
FIG. 4 is a plot of a voltammogram showing the electrochemical oxidation of 1,4-bis(5,10-dihydro-5-butyl-10-phenazine)benzene.

Dependence of the electronic communication on steric and distance factors can be seen in FIG. 4 which shows the voltammogram for the linked but not coupled compound 1,4-bis(5,10-dihydro-5-butyl-10-phenazine)benzene. A limited electronic communication between the phenazine systems is consistent with the fact that the first separation of the two oxidation waves is not resolvable (less than 20 mV). We believe this is due to the steric interaction of the protons at the 1 and 9 positions of the phenazine and the hydrogen atoms on the linking benzene ring.

Figure 5:
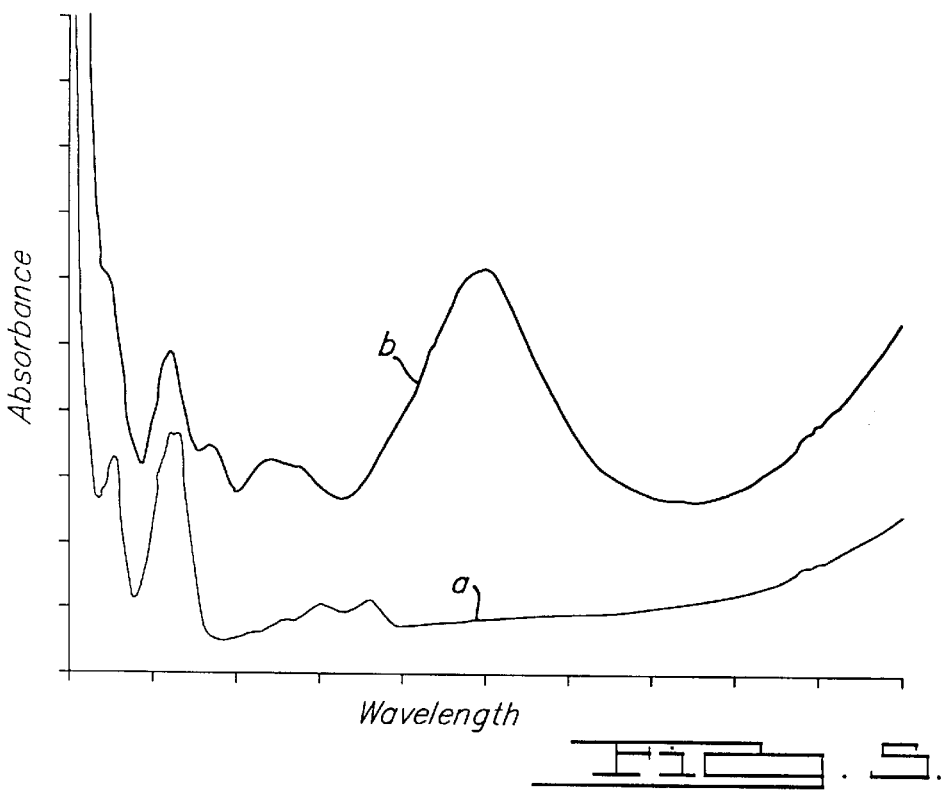
FIG. 5 is the absorbance spectrum of the 5,10-dimethyl-5,10-dihydrophenazine cation, and the dication of 2,2'-bis(5,10-dimethyl-5,10-dihydrophenazine), respectively.

Further evidence of coupling is evident from the absorption spectrum of the coupled electrochromic compounds. Anodic electrochromic materials exhibit a change in their extinction coefficient at least one wavelength in the visible region of the electromagnetic spectrum on electrochemical oxidation, and can be said to exhibit "electrochromic activity" at those wavelengths. The coupled compounds of this invention exhibit electrochromic activity at wavelengths where the monomeric compounds do not exhibit electrochromic activity when they have been oxidized to the same "relative electron density" change. FIG. 5 shows an example of a coupled electrochromic compound that exhibits electrochromic activity at wavelengths where the anodic monomeric electrochromic compound does not.

FIG. 5a shows the absorption spectrum of 5,10-dimethyl-5,10-dihydrophenazine cation, showing a weak band at about 700 nm and the more intense band near 450 nm. FIG. 5b, by comparison, shows the absorption spectrum of 2,2'-bis(5,10-dimethyl-5,10-dihydrophenazine) dication. The strong absorbance in the near infrared region (900 nm) is a clear indication that the electronic states of this molecule are very different from the monomeric electrochromic compound. In this case the cation of the monomeric compound and the dication of the coupled compound have the same relative electron density change.

Figure 6:
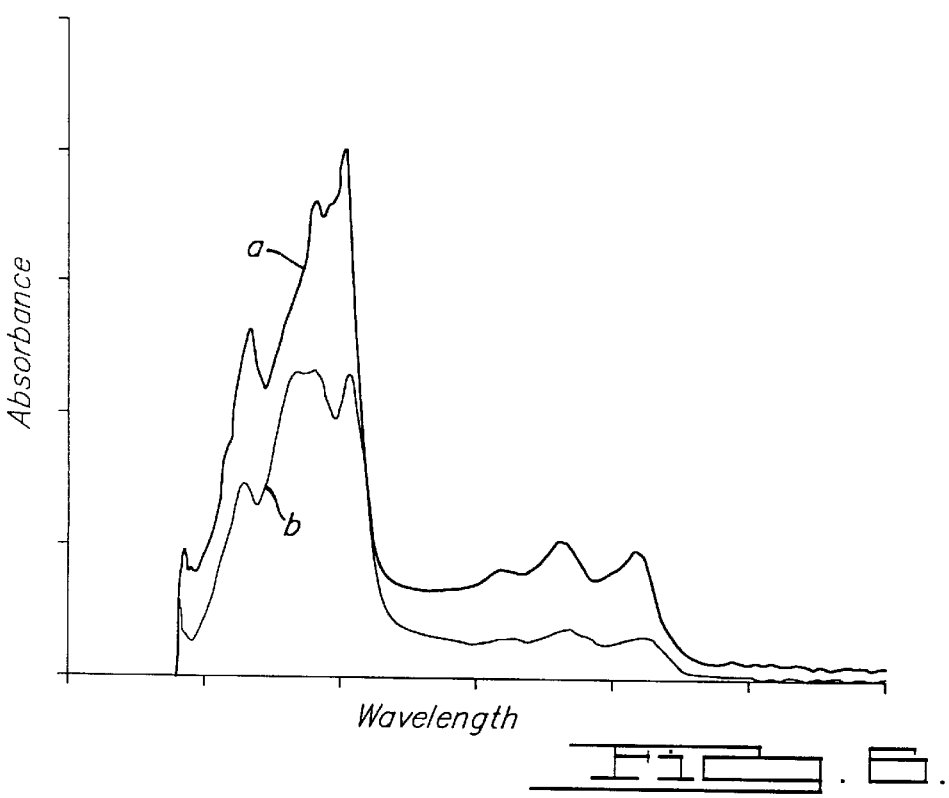
FIG. 6 is the absorbance spectrum of the 1,4-bis(5,10-dihydro-5-butyl-10-phenazine)benzene dication.

FIG. 6a shows the absorption spectrum of 1,4-bis(5,10-dihydro-5-butyl-10-phenazine)benzene. This compound with the presumed large steric interaction severely limiting the electronic communication between the halves of the molecule shows an absorbance spectrum that has absorbance bands at roughly the same wavelengths as the monomeric compound, 5,10-dimethyl-5,10-dihydrophenazine. It is noted here that various alkyl groups, and the phenyl group in place of the methyl groups in the 5,10-dihydrophenazines do not change the absorbance spectrum of the phenazine cation to a great extent.

In the case of 2,2'-bisphenazines, the presence of a closed shell π electron system involving both of the monomeric electrochromic compounds in the +2 oxidation form is a reasonable explanation for the effects on the voltammogram and absorption spectrum. Thus the reduced form:

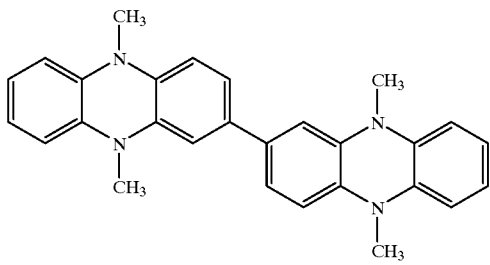

can be oxidized to the dication, a resonance structure of which can be written:

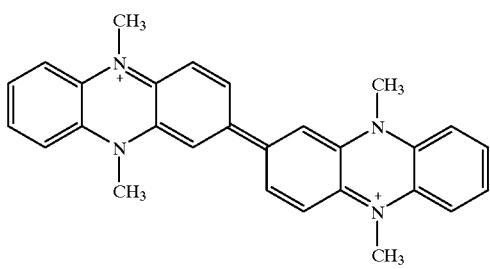

This closed shell resonance form contains no radicals, and molecular orbital calculations such as AMPAC predict that this resonance form is important in the consideration of the atomic and electronic structure of the compound.

Having generally described this invention, a further understanding can be obtained by reference to certain specific examples which are provided herein for purposes of illustration only and are not intended to be limiting unless otherwise specified.

EXAMPLE 1

Synthesis of 5,5',10,10'-tetramethyl-2,2'-bisphenazine

To a 100 ml 3-necked round bottom flask 4.3 g 3,3'-diaminobenzidine and 13.2 g catecol were mixed, and the mixture heated to 150° C. for 16 hours. The mixture was then cooled to 100° C., and 50 ml of water added. The solution was heated to reflux for 1 hour, cooled, and the solid tetrahydrobis(phenazine) isolated by filtration. Alkylation of the tetrahydrobis(phenazine) was accomplished by the method described in U.S. patent application Ser. No. 09/280,396.

EXAMPLE 2

Syntheses of 5,5',10,10'-tetramethyl-2,2'-bis[a]benzophenazine

In a 3-necked round bottom flask 7.9 g 1,2-naphthoquinone was dissolved in 100 ml acetic acid and heated to 60° C. 5.0 g of 3,3'-diaminobenzidine was dissolved in 200 ml ethanol and the 100 ml acetic acid containing the naphthoquinone was dripped into the benzidine solution followed by stirring at 60° C. for 2.5 hours. The mixture was then cooled and the solid bisphenazine separated by filtration. Alkylation of the bisphenazine was accomplished by preparing a 3:1 mole:mole alloy of K:Na in refluxing toluene. After the mixture cooled, the toluene was removed, and dimethoxyethane added. The bisphenazine was added in a 1:10 mole:mole ratio with the alloy, and the mixture was allowed to stir for 2 hours at 50° C. Methyl iodide was added, and the product isolated by standard techniques.

EXAMPLE 3

Alkylation of 5,5',10,10'-tetramethyl-2,2'-bis[b]benzophenazine 2,2'-bis[b]benzophenazine was prepared analogously to the benzo[a]phenazine of Example 2. Alkylation of the bisphenazine was accomplished by preparing a 3:1 mole:mole alloy of K:Na in refluxing toluene. After the mixture cooled, the toluene was removed, and dimethoxyethane added. The bisphenazine was added in a 1:10 mole:mole ratio with the alloy and the mixture was allowed to stir for 2 hours at 50° C. Methyl iodide was added, and the product subsequently isolated.

EXAMPLE 4

Syntheses of 5,5',10,10'-tetramethyl-2,2'-bis[a,c]benzophenazine 11.5 g phenanthroquinone was dissolved in 400 ml acetic acid and heated to 105° C. 5.4 g of 3,3'-diaminobenzidine was dissolved in 200 ml ethanol and the 400 ml acetic acid containing phenanthraquinone was dripped into the benzidine solution, and was stirred at 100° C. for 1 hour. The mixture was then cooled, and the solid bisphenazine separated by filtration. Alkylation of the bisphenazine was accomplished by forming a 3:1 mole:mole alloy of K:Na in refluxing toluene. After the mixture cooled, the toluene was removed, and dimethoxyethane added. The bisphenazine was added in a 1:10 mole:mole ratio with the alloy, and the mixture allowed to stir for 2 hours at 50° C. Methyl iodide was added and the product isolated.

EXAMPLE 5

Syntheses of 5,5', 10,10'-tetrahydro-bis(5,5'-dibutylphenazine)-1,4-benzene 6.6 g 1,4-diiodobenzene was dissolved in 100 ml diethylether and cooled to 0° C. in argon atmosphere. 18 ml 2.5M n-butyllithium solution was added over a period of 15 minutes while carefully excluding air. The mixture was stirred for 10 minutes. 9.0 g of phenazine was then added over a period of 2 hour following which the mixture is stirred for 1 hour at 0° C. A solution of iodobutane in THF was added and the solution allowed to warm to room temperature. The product, containing two 5-butyl-5,10-dihydrophenazine electrochromic compound molecules linked at the 10,10' positions by a 1,4-phenyl coupling group, was then isolated.

EXAMPLE 6

Synthesis of 5,5',10,10'-tetrahydro-5,5',10,10'-tetrabutyl 2,2'bis(7,7'-trifluoromethylphenazine) and 5,5',10,10'-tetrahydro-5,5',10,10'-tetrabutyl 2,2'bis(8, 8'-trifluoromethylphenazine)

21.4 g 3,3'-diaminobenzidine, 54.0 g of 4-bromo-3-nitrobenzotrifluoride and 21.2 g $Na_2CO_3$ were added to 200 ml DMF in a 500 ml round bottom flask. The mixture was heated to 120–130° C. for 16 hours. The mixture was then cooled, water added, and product extracted into an ethyl acetate layer. The ethyl acetate was then evaporated off. The residue was then dissolved in 200 ml of methanol, and this solution added to a solution of 75.9 g $SnCl_2$ dissolved in 100 ml conc. HCl. The mixture was heated to 60–70° C., the temperature being maintained for 16 hours. An additional 35 g $SnCl_2$ was added and the mixture stirred for 4 hours at 60–70° C. The methanol was evaporated, and the pH of the solution is gradually increased by adding NaOH, followed by another extraction into ethyl acetate. The ethyl acetate was evaporated, and the resulting material dissolved in 500 ml methanol. To this solution 162.2 g of $FeCl_3$ was slowly added, and the mixture heated to reflux. The reaction mixture was cooled and water added, and the bisphenazine filtered off as a dark solid. The bisphenazine was alkylated by the method described in Example 1.

EXAMPLE 7

Synthesis of 5,5',10,10'-tetrahydro-bis(5,5'-diphenylphenazine)-1,4-buta-(1,3)-diyne 4.5 g phenazine was dissolved in 100 ml dimethoxyethane and cooled to 0° C. in a nitrogen atmosphere. 16.7 ml 1.8M phenyllithium was added over a period of 10 minutes, carefully excluding air. The mixture is stirred for 1.5 hours. 1.7 g KOH and 30 ml DMSO were added to the resulting slurry and stirred for 1 hour. 6.4 g trifluoroethyliodide was added and the mixture was left to stir for 10 days at room temperature. The product was isolated and characterized by mass spectral analysis and cyclic voltametry.

EXAMPLE 8

Synthesis of bis 1,2-(5,10-tetrahydro-5,10-dimethylphenazine)ethene

The synthesis of the bisphenazine ethene was accomplished via the direct coupling of 2-formyl-5,10-dihydro-5, 10-dimethyphenazine via amodification of the process described (JACS (117)p. 4468–4475, 1995). The 2-formyl compound was coupled using $TiCl_4$ and Zn in THF/Pyridine gave the desired compounds.

EXAMPLE 9

Synthesis of 5,5',10,10'-tetrahydro-5,5',6,6',10,10'-hexamethyl-2,2'-bisphenazine 10.0 g 3,3'-diaminobenzidine and 34.7 g 3-methylcatechol were mixed together in 40 ml ethylene glycol in a 500 ml round bottom flask. The mixture was heated to reflux. The reaction mixture was cooled to 80° C. and 400 ml water was then added, and the mixture reheated to reflux. The reaction mixture was cooled to room temperature. After two washes with water, the solid was filtered and dried overnight.

Alkylation of the material was accomplished via the one-pot synthesis described in Example 1. The final product was characterized by electrochemical methods to have oxidation waves at 280, 376,976, and 1092 mV (on a scale where the first oxidation of 5,10-dimethyl-5,10-dihydrophenazine is assigned a value of 300 mV).

EXAMPLE 10

Synthesis of 5.5',7(8),7'(8'),10,10'-hexamethyl-2,2'-bisphenazine 10.0 g 3,3'-diaminobenzidine and 34.7 g 4-methylcatechol were mixed together in 40 ml ethylene glycol in a 500 ml round bottom flask. The mixture was heated to reflux for 24 hours. The temperature drops to 203°, and using a Dean Stark condenser, 5 ml of ethylene glycol was removed and the mixture allowed to reflux for an additional 24 hours. The reaction mixture was cooled to 80° and 250 ml water added, following which the reaction mixture was cooled to room temperature. After three washes with water, the solid was separated by filtration.

Alkylation of the material was accomplished via the one-pot synthesis described in Example 1. The final product was characterized by electrochemical methods to have oxidation waves at 200, 308, 924 and 1044 mV (on a scale where the first oxidation of 5,10-dimethyl-5,10-dihydrophenazine is assigned a value of 300 mV).

EXAMPLE 11

Synthesis of 10,10'-dimethyl-3,3'-bisphenothiazine 2.0 g N,N'-diphenylbenzidine, 0.57 g sulfur and 0.3 g iodine were heated to 210°. After most of the starting material was converted, 10 ml xylene and 0.2 g sulfur are added and the mixture allowed to reflux for 16 hours. The reaction mixture was cooled to room temperature, 40 ml benzene added to the mixture, and the solid product isolated by filtration. Alkylation of the material was accomplished as described in Example 1.

EXAMPLE 12

An electrochromic window was prepared from two pieces of LOF TEC glass spaced apart 250 microns with an epoxy seal, and vacuum filled with a solution of 16 mM methyl viologen tetrafluoroborate, 8 mM 5,5',10,10'-tetrahydro-5, 5',10,10'-tetramethyl 2,2'-bisphenazine, and 30 mM Tinuvin-P® in propylene carbonate with 3 weight percent PMMA.

The device exhibited a transmittance (Y D65/2) of 72% initially and with application of 1.2V the transmittance decreased to 4% in about 20 seconds. Shorting the electrodes of the device restored the device to its original transmittance level.

The device was cycled in an Atlas Weather-Ometer operating at 0.55 W/m²nm at 340 nm for 1614 hours. After this period the transmittance was reduced only slightly, to 63%. Application of 1.2V decreased the transmittance of the device to 4.3%. Shorting the electrodes of the device returned the transmittance to 63%.

EXAMPLE 13

A solution of 2 mM 2,2'-bis-DMP in propylene carbonate was oxidized to the +2 state and flame-sealed into an evacuated glass tube. The tube was placed in a Weather-Ometer operating at 0.55 W/m²nm at 340 nm for 2645 hours. The tube was then opened and DPV run on the solution. The electrochemistry showed very little change compared with a sample of non-irradiated 2,2'-bis-5,10-dimethyl-5,10-dihydrophenazine.

What is claimed is:

1. An electrochromic medium comprising two or more electroactive compounds, at least one of said electroactive compounds being a coupled electrochromic compound comprising a first anodic monomeric electrochromic compound coupled by a bridge comprising a covalent bond or an intervening hydrocarbon structure optionally containing one or more heteroatoms, to a second anodic monomeric electrochromic compound, and optionally additional monomeric electrochromic compounds such that electronic communication is exhibited between said anodic monomeric compounds.

2. The electrochromic medium of claim 1, wherein said first anodic monomeric electrochromic compound and said second anodic monomeric electrochromic compound are independently selected from the group consisting of substituted or unsubstituted dihydrophenazines, benzidines, phenothiazines, phenoxazines, triphenodioxazines, triphenodithiazines, quinoxalinophenazines, phenylenediamines, benzimidazole azines, benzoxazole azines, carbazoles, benzothiazoles, and mixtures thereof.

3. The electrochromic medium of claim 1 wherein said first anodic monomeric electrochromic compound and said second anodic monomeric electrochromic compound are optionally substituted 5,10-dihydrophenazines.

4. The electrochromic medium of claim 1 wherein the said coupled electrochromic compound is selected from one of the following structures:

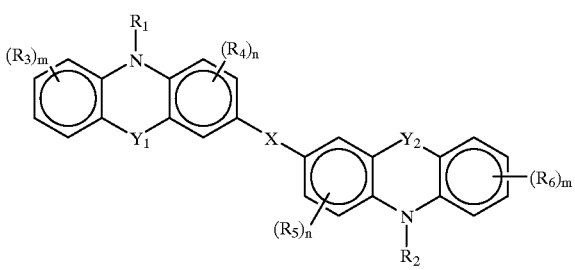

[I]

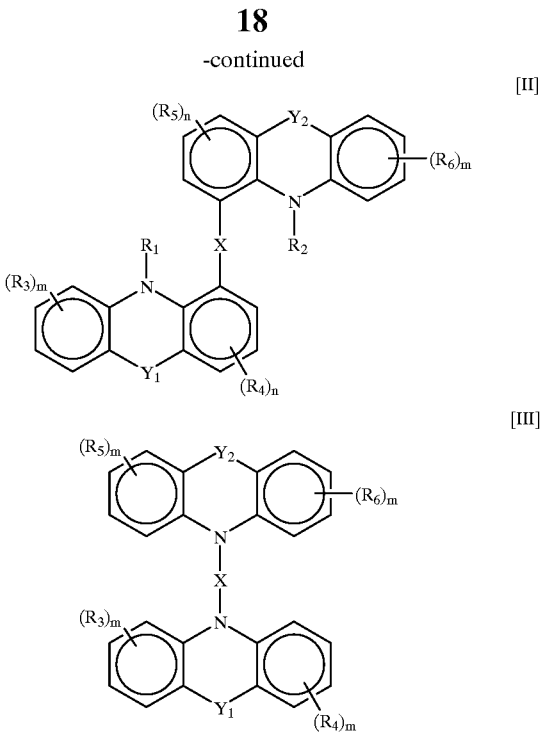

where $Y_1$ and $Y_2$ are selected from O, S, and N—$R_7$; and

X represents a coupling group or unit such as $C_{1-3}$ alkyl, $C_{2-6}$ alkenyl, $C_{2-6}$ alkynyl, $C_{4-10}$ cycloalkenyl, $C_{6-20}$ aryl, $C_{7-20}$ alkaryl, $C_{7-20}$ aralkyl; optionally containing heteroatoms; and $R_1$ through $R_7$ are the same or different hydrocarbon groups such as $C_{1-20}$ alkyl, $C_{2-20}$ alkenyl, $C_{2-20}$ alkynyl, $C_{3-20}$ cycloalkyl, $C_{4-20}$ cycloalkenyl, $C_{6-20}$ aryl, $C_{7-20}$ alkaryl, $C_{7-20}$ aralkyl; and the like n is an integer from 1–3; and m is an integer from 1–4.

5. An electrochromic device which comprises an electrochromic medium of claim 1.

6. An electrochromic medium comprising two or more electroactive compounds, at least one of said electroactive compounds being a coupled electrochromic compound comprising a first anodic monomeric electrochromic compound coupled by a bridge comprising a covalent bond or an intervening hydrocarbon structure optionally containing one or more heteroatoms to a second anodic monomeric electrochromic compound, and optionally additional anodic monomeric compounds such that the absorption spectrum of said coupled electrochromic compound is different from the sum of the absorption spectrum of a mixture of the individual anodic monomeric compounds on an identical mole basis.

7. The medium of claim 6 wherein said first anodic monomeric electrochromic compound and said second anodic monomeric electrochromic compound are independently selected from the group consisting of substituted or unsubstituted dihydrophenazines, benzidines, phenothiazines, triphenodioxazines, phenoxazines, triphenodithiazines, quinoxalinophenazines, phenylenediamines, benzimidazole azines, benzoxazole azines, carbazoles, benzothiazoles azines, and mixtures thereof.

8. The medium of claim 6 herein the said coupled compound is selected from the group consisting of:

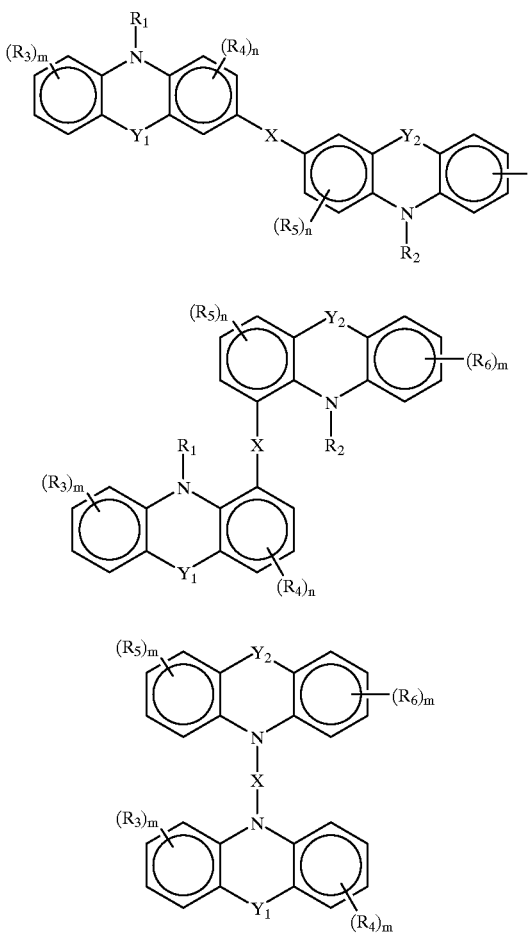

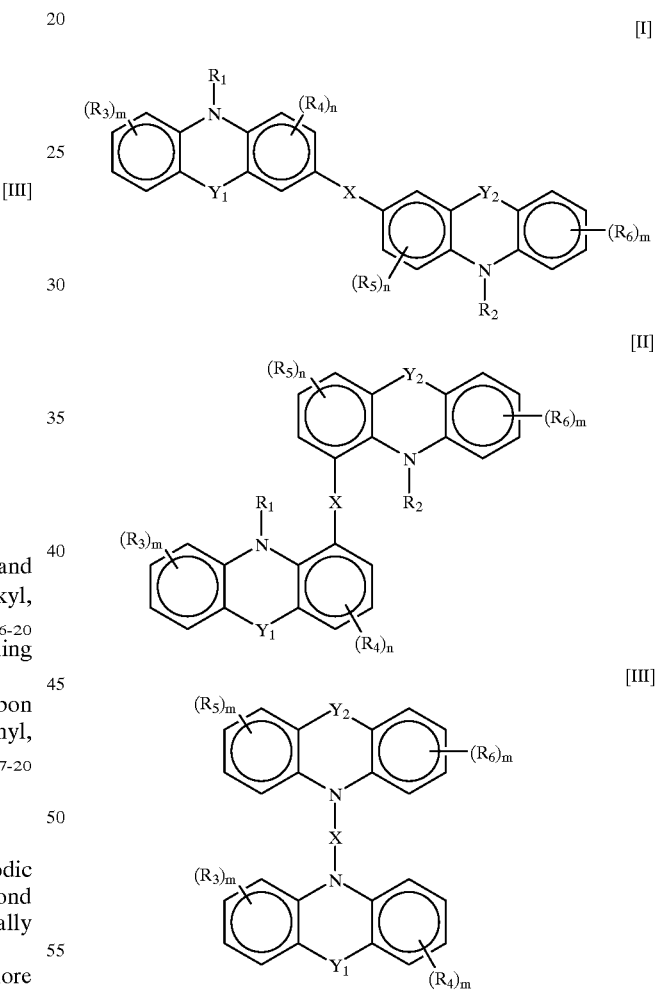

where $Y_1$ and $Y_2$ are selected from O, S, and N—$R_7$; and

X represents a coupling group or unit such as $C_{1-3}$ alkyl, $C_{2-6}$ alkenyl, $C_{2-6}$ alkynyl, $C_{4-10}$ cycloalkenyl, $C_{6-20}$ aryl, $C_{7-20}$ alkaryl, $C_{7-20}$ aralkyl; optionally containing heteroatoms; and $R_1$ through $R_7$ are the same or different hydrocarbon groups such as $C_{1-20}$ alkyl, $C_{2-20}$ alkenyl, $C_{2-20}$ alkynyl, $C_{3-20}$ cycloalkyl, $C_{4-20}$ cycloalkenyl, $C_{6-20}$ aryl, $C_{7-20}$ alkaryl, $C_{7-20}$ aralkyl; and the like n is an integer from 1–3; and m is an integer from 1–4.

9. The medium of claim 6 wherein said first anodic monomeric electrochromic compound and said second anodic monomeric electrochromic compound are optionally substituted 5,10-dihydrophenazines.

10. An electrochromic medium comprising two or more electroactive compounds, at least one of said electroactive compounds being a coupled electrochromic compound comprising a first anodic monomeric electrochromic compound coupled by a bridge comprising a covalent bond or an intervening hydrocarbon structure optionally containing one or more heteroatoms to a second anodic monomeric electrochromic compound such, and optionally additional anodic monomeric electrochromic compounds that the voltammogram of said coupled electrochromic compound is measurably different from said anodic monomeric compounds when run in the same solvent.

11. The medium of claim 10 wherein said first anodic monomeric electrochromic compound and said second anodic monomeric electrochromic compound are independently selected from the group consisting of substituted or unsubstituted dihydrophenazines, benzidines, phenothiazines, triphenodioxazines, phenoxazine, triphenodithiazines, quinoxalinophenazines, phenylenediamines, benzimidazole azines, benzoxazole azines, carbazoles, benzothiazole azines, and mixtures thereof.

12. The electrochromic device of claim 11 wherein said device is an electrochromic window.

13. The medium of claim 10 wherein said first anodic monomeric electrochromic compound and said second anodic monomeric electrochromic compound are optionally substituted 5,10-dihydrophenazines.

14. The medium of claim 10 wherein the coupled electrochromic compound is selected from the group consisting of:

where $Y_1$ and $Y_2$ are selected from O, S, and N—$R_7$; and

X represents a coupling group or unit such as $C_{1-3}$ alkyl, $C_{2-6}$ alkenyl, $C_{2-6}$ alkynyl, $C_{4-10}$ cycloalkenyl, $C_{6-20}$ aryl, $C_{7-20}$ alkaryl, $C_{7-20}$ aralkyl; optionally containing heteroatoms; and $R_1$ through $R_7$ are the same or different hydrocarbon groups such as $C_{1-20}$ alkyl, $C_{2-20}$ alkenyl, $C_{2-20}$ alkynyl, $C_{3-20}$ cycloalkyl, $C_{4-20}$ cycloalkenyl, $C_{6-20}$ aryl, $C_{7-20}$ alkaryl, $C_{7-20}$ aralkyl; and the like n is an integer from 1–3; and m is an integer from 1–4.

15. An electrochromic device comprising: a first transparent substrate, a second substrate, a sealing member disposed between said first and second substrates to define a chamber; an electrochromic medium disposed in said chamber, said electrochromic medium comprising two or more electroactive compounds, at least one of said electroactive compounds being a coupled electrochromic compound comprising a first anodic monomeric electrochromic compound coupled by a bridge to a second anodic monomeric electrochromic compound, such that electronic communication is exhibited between said first anodic compound and said second anodic compound.

16. An electrochromic device comprising: a first transparent substrate, a second substrate, a sealing member disposed between said first and second substrates to define a chamber; an electrochromic medium disposed in said chamber, said electrochromic medium comprising two or more electroactive compounds, at least one of said electroactive compounds being a coupled electrochromic compound comprising a first anodic monomeric electrochromic compound coupled by a bridge to a second anodic monomeric electrochromic compound, such that the absorption spectrum of said coupled electrochromic compound is different from the sum of the absorption spectrum of a mixture of the individual first and second anodic electrochromic compound on an identical mole basis.

17. An electrochromic device comprising: a first transparent substrate, a second substrate, a sealing member disposed between said first and second substrates to define a chamber; an electrochromic medium disposed in said chamber, said electrochromic medium comprising, two or more electroactive compounds, at least one of said electroactive compounds being a coupled electrochromic compound comprising a first anodic monomeric electrochromic compound coupled by a bridge to a second anodic monomeric electrochromic compound, such that the voltammogram of said coupled electrochromic compound is measurably different from said first and second monomeric electrochromic compounds when run in the same solvent.

18. A coupled electrochromic compound comprising a first anodic monomeric electrochromic compound coupled by a bridge to a second anodic monomeric electrochromic compound such that the absorption spectrum of said coupled electrochromic compound at the same relative electron density change as the monomeric compounds has at least one absorption band that is absent in the monomeric electrochromic compounds.

19. A coupled electrochromic compound comprising a first anodic monomeric electrochromic compound coupled by a bridge comprising a covalent bond or an intervening hydrocarbon structure optionally containing one or more heteroatoms to a second anodic monomeric electrochromic compound such that the absorption spectrum of said coupled electrochromic compound at the same relative electron density change as the monomeric compounds exhibits electrochromic activity at least one wavelength different from the monomeric compounds.

20. A compound of claim 19 wherein the said wavelength is in the near-infrared portion of the electromagnetic spectrum.

* * * * *